R. M. BALDWIN.
ROAD CROSSING RECORDER.
APPLICATION FILED JAN. 10, 1916.
1,304,727.
Patented May 27, 1919.
2 SHEETS—SHEET 1.
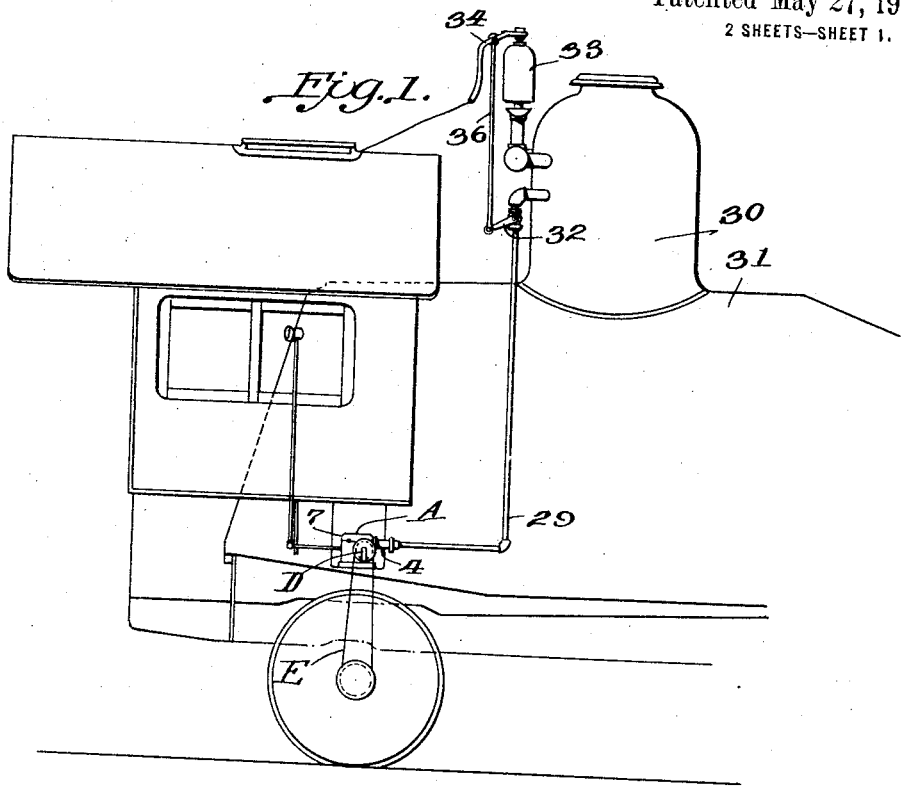
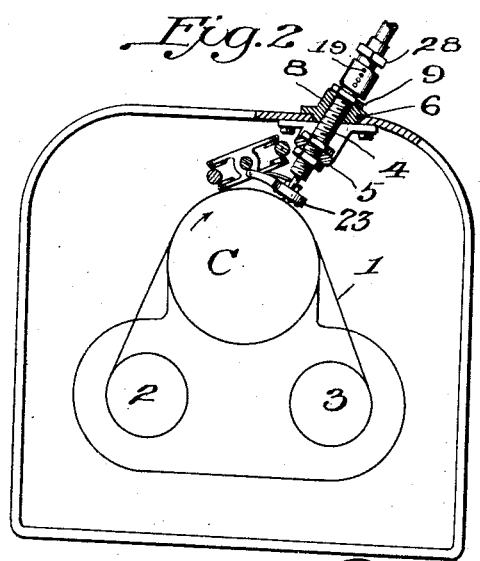
Inventor
Robert M. Baldwin
Vernon E. Hodges
His Attorney R. M. BALDWIN.
ROAD CROSSING RECORDER.
APPLICATION FILED JAN. 10, 1916.
1,304,727.
Patented May 27, 1919.
2 SHEETS—SHEET 2.
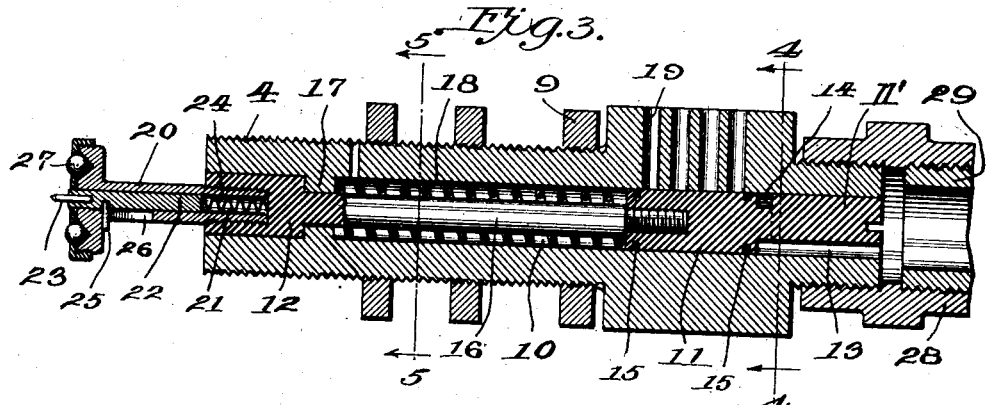
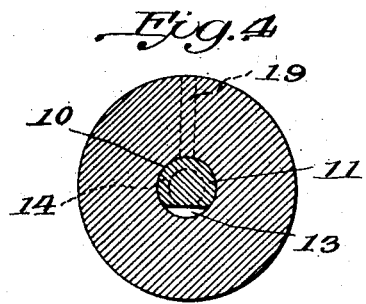
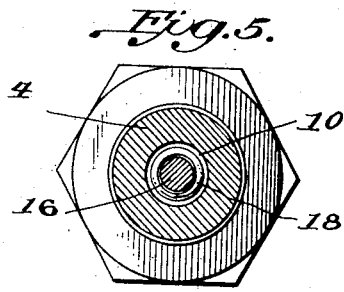
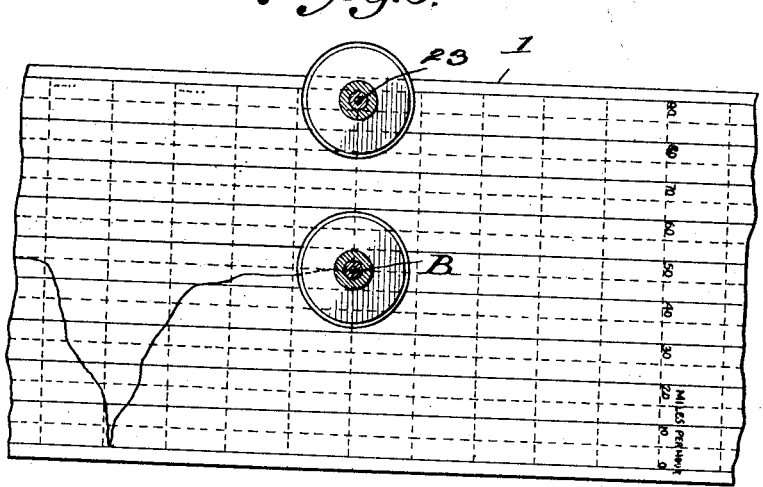
Inventor
Robert M. Baldwin
By Vernon E. Hodges
His Attorney

UNITED STATES PATENT OFFICE.

ROBERT M. BALDWIN, OF RICHMOND, VIRGINIA.

ROAD-CROSSING RECORDER.

1,304,727.	Specification of Letters Patent.	Patented May 27, 1919.

Application filed January 10, 1916. Serial No. 71,232.

*To all whom it may concern:*

Be it known that I, ROBERT M. BALDWIN, a citizen of the United States, residing at Richmond, in the county of Henrico and State of Virginia, have invented certain new and useful Improvements in Road-Crossing Recorders, of which the following is a specification.

My invention relates to an improvement in road crossing recorders.

It is customary for the engineer to slacken speed and blow a whistle at road-crossings, and, where accidents have occurred at crossings, it is frequently difficult to prove whether or not the required whistle has been blown, the engineer swearing to one thing, and the other witnesses perhaps to another. The object of my invention is to provide a simple means whereby an ineffaceable record is made at every time and place where the whistle is blown.

My present invention comprises a device applicable to the locomotive speed-recorders now in use, which will make an impression on the moving tape, which will indicate reliably when and where the whistle is blown, the stencil being operated by a valve simultaneously actuated with the whistle, and thus making an accurate record on the tape of the blowing of the whistle.

In the accompanying drawings:—

Figure 1 is a view showing my device as applied to an engine and recorder;

Fig. 2 is a top plan view of a speed recorder showing my crossing recorder attached;

Fig. 3 is an enlarged sectional view of the crossing recorder;

Fig. 4 is a transverse section in line 4—4 of Fig. 3;

Fig. 5 is a transverse section on line 5—5 of Fig. 3; and

Fig. 6 is a diagrammatic view of the tape showing the relative position of recording stencils.

The numeral A represents the usual Boyer speed recorder now generally used to record upon a tape the speed of the locomotive, and the numeral 1 is the tape which is wound and unwound over the drums 2 and 3.

C indicates the cylinder or drum for presenting the record paper to the stylus or pencil, said drums 2 and 3 being driven by suitable gearing (not shown) from the main drive shaft D of the recorder, which in turn is driven by belt E, passing around one of the axles of the engine or car. The drums 2 and 3 act or may act alternately as delivering and receiving rolls and both may be positively driven in one direction.

The barrel 4 of crossing recorder is adapted to be received in a bracket 5 which is preferably secured to the side wall of the casing of the recorder in such a position as to bring the crossing recorder directly in line and well above the pencil B of the speed recorder, the stencil of the crossing recorder making its impression at the extreme upper edge of the tape.

A slot 6 in the cover 7 allows the same to be closed down over the crossing recorder as attached and a collar or dust cap 8 mounted thereon, is adapted to fit tightly against the slot 6 by an adjusting nut 9.

The barrel 4 is provided with a central bore 10, which is adapted to receive a plunger made up in two sections 11 and 12. The outer end 11' of the plunger is provided with a slot or cut away portion 13 extending inwardly about half of its length and parallel with its axis, connecting at its inner end with an annular groove 14, packing rings 15 are arranged in the body portion of the plunger to insure a tight sliding fit.

The inner section 12 of the plunger is approximately the same diameter at its outer end as the bore of the barrel. Its inner portion, however, is somewhat smaller in diameter thereby forming a stem 16, screw threaded at its end and adapted to be received in the tapped inner end of the section 11, it follows that these sections 11 and 12 move together. An annular flange 17 directly in the rear of the head of the inner section 11, limits the backward movement of the plunger against the tension of a spiral spring 18 surrounding the stem 16, its ends abutting against the annular flange 17 and the inner end of the plunger section 11.

A plurality of exhaust ports 19 are arranged laterally in the barrel, their inner ends adapted to register with the annular groove 14, in the section 11 of the plunger thereby releasing the pressure on the head 11' of the plunger and limiting its forward movement. These ports 19 may be in the form of a slot if desired.

A screw threaded member 20 is adapted to be received in the outer end of the section 12 of the plunger. This member is provided with a central bore 21, which is adapted to receive at its outer end a small plunger 22, the outer end of which is drilled out and adapted to receive a stencil 23. A spiral spring 24, placed between the inner end of the plunger 11 and the head of the section 12 acts to give a varying tension to the stencil 23, the said plunger being limited in its outer movement by a pin 25 extending laterally therefrom, through an elongated slot 26 arranged in the member 20. Arranged on the outer end of said member 20 is a ball bearing or similar device 27, which is adapted to bear against the tape 1, with the outward movement of the plunger, thereby relieving, to some extent, the extreme pressure which would be exerted on the stencil 23.

The extreme outer end of the barrel 4 is screw threaded and is adapted to receive a pipe coupling 28, which connects a pipe 29 leading from the dome 30 of the engine boiler 31.

A valve 32 arranged in the pipe 29 adjacent to the whistle 33 is adapted to be simultaneously actuated with the valve 34 of the whistle being connected thereto by a link 36 in order to simultaneously actuate said valve 32 with the blowing of the whistle, which in turn actuates the plunger to give the necessary impression of the stencil 23 on the slowly moving tape 1.

The movable medium is ruled and spaced to indicate distances, miles for instance, and in this way to indelibly record each blowing of the whistle at the point on the movable medium corresponding to the position or crossing in the road where the whistle is blown, thereby affording indisputable proof as to whether or not the whistle has been blown. The absence of these marks would incidentally indicate any neglect on his part to blow the whistle.

But mainly there would be the irrefutable evidence, or lack of evidence, on the part of the railroad as to whether or not the whistle had been blown at a given road crossing where an accident might occur and any attempt might be made on the part of complainants—the persons alleged to have been injured or damaged—to prove that the whistle had not been blown.

Obviously my improved device might be applied to different forms of speed recorders, or in different positions from that illustrated, it being desirable to have the plunger carrying the stencil directly over the stencil now used for indicating the speed, but at the same time out of its path, so that the markings on the tape resulting from the use of my device will not interfere with the markings of the speed recorder to which it is intended to be attached, and with which it is the intention to use it.

The invention is simple and easily applied, and is most effectual in the performance of the function required of it.

I claim:

1. A road crossing recorder attachment comprising a plunger having slidable connection with its support, and provided with a stencil at one end, a steam whistle, and a pipe leading from a pressure supply and discharging against the plunger at the opposite end from said stencil, means controlling the whistle and pressure supply for causing the plunger to move with the discharge of steam to blow the whistle, and means for quickly returning the plunger to its normal position.

2. The combination with a casing of a speed recorder, a casing detachably connected therewith, and a plunger slidable through the casing and having a stencil at one end, a steam whistle, and a pipe leading from a pressure supply and discharging against the plunger at the opposite end from said stencil, means controlling the whistle and pressure supply for causing the plunger to move with the discharge of steam to blow the whistle, and means for quickly returning the plunger to its normal position.

3. A road crossing recorder attachment comprising a plunger having slidable connection with its support, and provided with a stencil at one end, a steam whistle, a pipe leading from a pressure supply and discharging against the plunger at the opposite end from said stencil, means controlling the whistle and pressure supply for causing the plunger to move with the discharge of the steam to blow the whistle, means for releasing the pressure on the head of the plunger after it has traveled a predetermined distance, and means for quickly returning the plunger to its normal position.

4. A road crossing recorder attachment a casing, a plunger slidably arranged with said casing and provided with a stencil at one end, a steam whistle, and a pipe leading from the pressure supply and discharging against the plunger at the opposite end from said stencil, means controlling the whistle and pressure supply for causing the plunger to move with the discharge of steam to blow the whistle, an annular groove arranged adjacent to the head of the plunger, a horizontal groove leading from the outer end of said plunger to said annular groove, a plurality of ports radially arranged in said casing and adapted to register with said annular groove for releasing the pressure on the head of the plunger and limiting its forward movement, and means for quickly returning the plunger to its normal position.

In testimony whereof I affix my signature.

ROBERT M. BALDWIN.

Copies of this patent may be obtained for five cents each, by addressing the "Commissioner of Patents, Washington, D. C."